(12) United States Patent
Farber et al.

(10) Patent No.: US 6,486,907 B1
(45) Date of Patent: Nov. 26, 2002

(54) SATELLITE DISTRIBUTED TELEVISION

(75) Inventors: Allan Farber, Hashmonaim; Mor Alon, Hod Hasharon; Howard Loboda, Jerusalem, all of (IL)

(73) Assignee: Foxcom Ltd., Jerusalem (IL)

( * ) Notice: Subject to any disclaimer, the term of this patent is extended or adjusted under 35 U.S.C. 154(b) by 0 days.

(21) Appl. No.: 08/899,452

(22) Filed: Jul. 23, 1997

(30) Foreign Application Priority Data

Jan. 7, 1997 (IL) ................................................. 119972

(51) Int. Cl.[7] .................................................. H04N 7/10
(52) U.S. Cl. ........................................... 348/8; 455/3.2
(58) Field of Search ...................... 345/327; 348/6–12, 348/13, 725; 455/3.1, 3.2, 4.1, 4.2, 6.1, 6.2

(56) References Cited

U.S. PATENT DOCUMENTS

| | | | |
|---|---|---|---|
| 4,135,202 A | | 1/1979 | Cutler |
| 4,545,075 A | * | 10/1985 | Miller et al. |
| 4,959,862 A | * | 9/1990 | Davidon et al. ............... 380/10 |
| 5,136,411 A | * | 8/1992 | Paik et al. ................... 359/125 |
| 5,181,106 A | | 1/1993 | Sutherland |
| 5,204,767 A | | 4/1993 | Nakata et al. |
| 5,221,983 A | | 6/1993 | Wagner |
| 5,303,229 A | | 4/1994 | Withers et al. |
| 5,457,811 A | * | 10/1995 | Lemson |
| 5,481,542 A | * | 1/1996 | Logston et al. ............ 370/94.2 |
| 5,488,413 A | * | 1/1996 | Elder et al. .................... 348/13 |
| 5,504,609 A | | 4/1996 | Alexander et al. |
| 5,541,757 A | | 7/1996 | Fuse et al. |
| 5,572,347 A | | 11/1996 | Burton et al. |
| 5,574,964 A | * | 11/1996 | Hamlin ........................ 455/3.1 |
| 5,592,540 A | * | 1/1997 | Beveridge .................. 455/4.28 |
| 5,657,143 A | | 8/1997 | Hajj et al. |
| 5,659,351 A | | 8/1997 | Huber |
| 5,787,335 A | * | 7/1998 | Novak .......................... 455/3.2 |
| 5,805,975 A | | 9/1998 | Green, Sr. et al. ........... 455/3.2 |
| 5,995,258 A | * | 11/1999 | Weber et al. ................. 359/133 |

* cited by examiner

Primary Examiner—Chris Grant
(74) Attorney, Agent, or Firm—Darby & Darby (57) ABSTRACT

A satellite signal distribution system including a headend which includes a fiberoptic transmitter that combines satellite signals from a satellite antenna with non-satellite television signals, a plurality of signal receive and distribution units, a plurality of optical fiber links which communicate the combined satellite and non-satellite signals between the headend and the plurality of signal receive and distribution units, and a multiplicity of signal links which communicate signals between each of the plurality of signal receive and distribution units and a plurality of satellite signal receivers and non-satellite signal receivers.

23 Claims, 10 Drawing Sheets

SATELLITE DISTRIBUTED TELEVISION

FIELD OF THE INVENTION

The present invention relates to distribution of satellite signals generally and more particularly to multimode optical fiber links useful in such distribution.

BACKGROUND OF THE INVENTION

The use of optical fibers in cable television networks is well known in the art. The following patents are believed to be representative of the state of the art: U.S. Pat. Nos. 5,467,212; 5,499,047; 4,891,694; 5,517,232; 5,442,472; 5,394,182; 5,361,091 and 5,345,526. In addition, German Patent Document P4334440.2 describes a system in which TV signals are converted into serial ranges of lower frequencies. These signals are converted into optical signals which are sent to individual user receivers where the optical signals are converted back to electrical signals.

Cable television networks normally operate on AM analog signals in the 5–860 MHz frequency range.

Satellite signals are in the GHz range in one of a number of bands, known as L, C, Ku and X bands. Earth station terminals typically downconvert signals to a range of about 0.95 to 2.2 GHz (L-band) by a low noise block converter forming part of most satellite signal receiving antennas. These signals are difficult to transmit via long coaxial links. Single mode optical fibers are known to be used for point to point connections between satellite transceivers and satellite antennas.

In multi-unit dwellings such as apartment buildings, dormitories, prisons and hotels, conventional shared master antenna television (SMATV) distribution systems for satellite television are typically employed. SMATV systems comprise a headend which demodulates, decodes and modulates at low frequency AM television signals which are then distributed using coaxial cable. SMATV systems have a number of disadvantages. One disadvantage is the number of channels offered is small, typically between 10 and 20. Since the signals are ordinary decoded TV signals, the programming is easily pirated by those not licensed to view the programming. Another disadvantage may be inferior picture quality.

Another approach to distribute satellite television signals uses coaxial cable to distribute an L-band signal which is output from a low noise block converter (LNB). Because of the high attenuation of coaxial cable at 1–2 GHz, these systems require numerous line amplifiers to overcome losses as well as equalizers to cancel frequency tilt distortions. These effects set a practical limit on coaxial distribution systems to about 200 users and about 300 meters.

With digital satellite TV signals, the accumulated noise and distortion in coaxial cable distribution may cause network failure. Each of the network components has a small impedance mismatch. This causes small signal reflections which when summed coherently throughout the network may cause a distorted signal. With digital signals, the receivers may not recover clock pulses. This is a known threshold phenomenon and is very difficult to predict.

SUMMARY OF THE INVENTION

The present invention seeks to provide an L-band satellite signal distribution system which is greatly superior in performance as compared with the prior art.

There is thus provided in accordance with a preferred embodiment of the present invention a satellite signal distribution system including a headend which receives satellite signals from a satellite antenna, a plurality of satellite signal receive and distribution units, a plurality of optical fiber links which communicate satellite signals between the headend and the plurality of satellite signal receive and distribution units, and a multiplicity of satellite signal links which communicate satellite signals between each of said plurality of satellite signal receive and distribution units and plural satellite receivers.

In accordance with a preferred embodiment of the present invention, the system also includes a satellite antenna which is coupled to the headend.

Additionally in accordance with a preferred embodiment of the present invention, the system also includes satellite receivers and/or decoders which are coupled to at least some of the multiplicity of satellite signal links.

In accordance with a preferred embodiment of the present invention, the headend, the plurality of satellite signal receive and distribution units, the plurality of optical fiber links and the multiplicity of satellite signal links all carry satellite signals in a 1–2.2 GHz frequency range, whether in digital modulated or FM modulated format.

Further in accordance with a preferred embodiment of the present invention, the satellite receive and distribution units include a diplexer which outputs to a single coaxial cable a combination of the satellite signals and non-satellite television signals, i.e., terrestrial, off-air, CATV, security, interactive return path.

There is also provided in accordance with a preferred embodiment of the present invention a satellite signal distribution system including a headend which includes a fiberoptic transmitter that combines satellite signals from a satellite antenna with non-satellite television signals, a plurality of signal receive and distribution units, a plurality of optical fiber links which communicate the combined satellite and non-satellite signals between the headend and the plurality of signal receive and distribution units, and a multiplicity of signal links which communicate signals between each of the plurality of signal receive and distribution units and a plurality of satellite signal receivers and non-satellite signal receivers.

In accordance with a preferred embodiment of the present invention the system includes a laser, preferably located in the headend, that converts the combined satellite signals and the non-satellite television signals into optical signals. Preferably a photodiode, which may be located in the receive and distribution units, converts the optical signals into electrical signals.

Further in accordance with a preferred embodiment of the present invention a splitter is provided for feeding the electrical satellite signals and the non-satellite television signals to a satellite receiver and a television set or CATV receiver, respectively.

Additionally in accordance with a preferred embodiment of the present invention the system includes a plurality of a pair of splitters in communication with the photodiode, each the pair comprising a splitter for satellite signals and a splitter for non-satellite television signals, wherein a plurality of diplexers combines an output of each the pair of the splitters for feeding the satellite signals and the non-satellite television signals to a satellite receiver and a television set or CATV receiver, respectively.

Still further in accordance with a preferred embodiment of the present invention the system includes a non-satellite television return path for sending a return signal from a user to a source of a non-satellite television signal. The return signal may be sent on separate fibers, or alternatively, the return signal may be sent on a fiber by means of a wavelength division multiplexer.

There is additionally provided in accordance with a preferred embodiment of the present invention an optical fiber link for RF signals comprising an optical transmitter, a multimode optical fiber and an optical receiver.

It is a particular feature of the present invention that RF signals, i.e. analog signals, whether or not digitally modulated, having a frequency in excess of about 1 GHz, are carried on a multimode optical fiber.

In accordance with a preferred embodiment of the present invention, the optical transmitter comprises a vertical cavity surface emitting laser.

Further in accordance with a preferred embodiment of the present invention, the optical transmitter comprises an edge emitting laser.

There is additionally provided in accordance with a preferred embodiment of the present invention a star network comprising a plurality of optical fiber links of the type described above. Preferably, the optical transmitters are placed at the hub of the star.

BRIEF DESCRIPTION OF THE DRAWINGS

The present invention will be understood and appreciated by persons skilled in the art from the following detailed description taken in conjunction with the drawings in which.

DETAILED DESCRIPTION OF A PREFERRED EMBODIMENT

Figure 1:
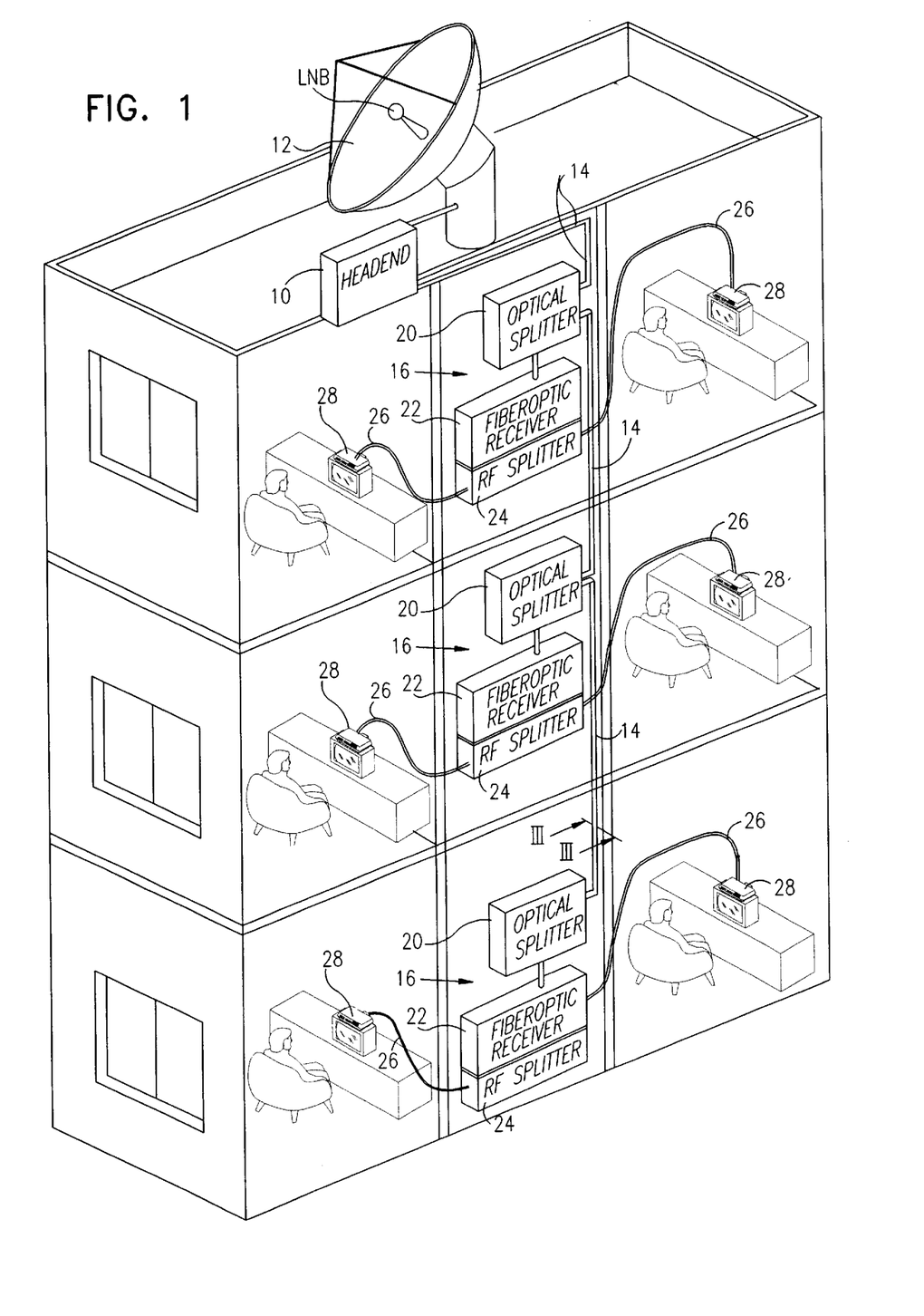
FIG. 1 is a simplified pictorial illustration of a satellite signal distribution system constructed and operative in accordance with a preferred embodiment of the present invention.

Reference is now made to FIG. 1, which is a simplified pictorial illustration of a satellite signal distribution system constructed and operative in accordance with a preferred embodiment of the present invention. The satellite signal distribution system of the present invention seeks to provide a solution to satellite television distribution in large multi-unit dwellings which cannot adequately be served by existing coaxial networks.

The satellite signal distribution system of FIG. 1 preferably comprises a headend 10 which receives satellite signals from a satellite antenna 12 and includes an RF fiberoptic transmitter which transmits a combined signal along segments of an optical fiber 14 to which are connected, typically in series, a plurality of satellite signal receive and distribution units 16.

Each of the receive and distribution units 16 comprises an optical splitter 20 which splits the received optical signal into a first portion which is supplied to a fiberoptic receiver 22, and a second part which is connected to an additional segment of optical fiber 14. The fiberoptic receiver 22 outputs to an RF splitter 24 which supplies RF signals along individual satellite signal links 26, each of which supplies at least one satellite receiver 28.

Satellite receiver and distribution units 16 preferably provide the following functions:

1) receive optical signals and convert to RF signals;
2) equalize any frequency tilt which is caused primarily by the coaxial cable to the satellite receiver;
3) diplex the UHF/VHF/CATV signal from 50–860 MHz with the L-band signal, allowing a return path using the frequency band 5–40 MHz;
4) split the signal into a number of outputs, for example 16 outputs as shown hereinbelow with reference to FIG. 6; and
5) provide an interface to standard satellite receivers. A common feature is for the user to choose which satellite signal he wishes. This may be achieved with a voltage level (13 V or 18 V) or a tone on the coaxial cable input to the satellite receiver. Satellite receiver and distribution units 16 may sense this voltage or tone and may switch to the indicated satellite receiver. It is appreciated that the functions described hereinabove with reference to FIG. 1 may be separated physically into different modules.

Figure 2:
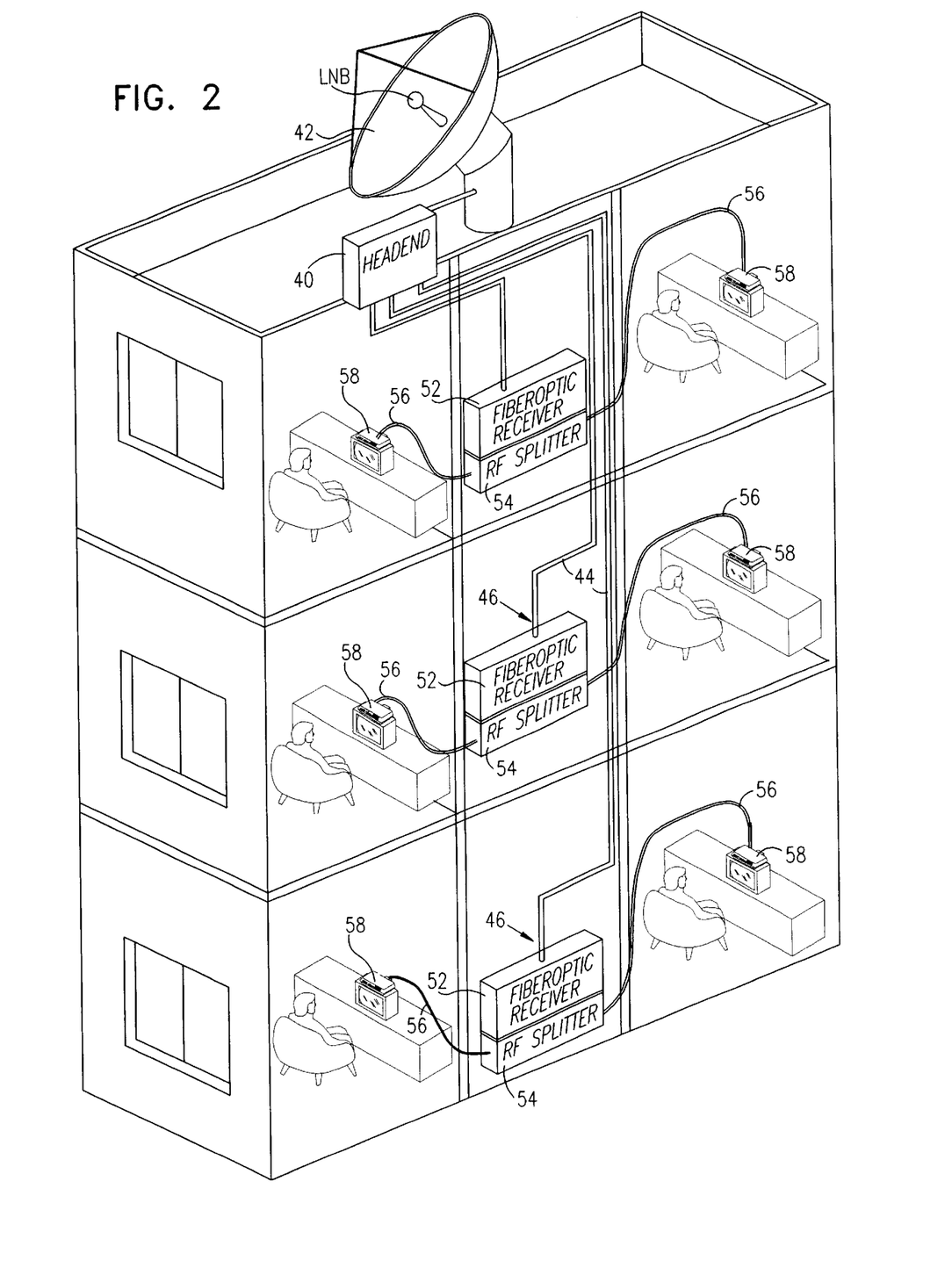
FIG. 2 is a simplified pictorial illustration of a satellite signal distribution system constructed and operative in accordance with another preferred embodiment of the present invention.

Reference is now made to FIG. 2, which is a simplified pictorial illustration of a satellite signal distribution system constructed and operative in accordance with another preferred embodiment of the present invention.

In the embodiment of FIG. 2, a headend 40 which receives satellite signals from a satellite antenna 42 includes an RF fiberoptic transmitter which transmits a combined signal along multiple parallel optical fibers 44, each of which supplies the satellite signals to a satellite signal receive and distribution unit 46.

Each of the receive and distribution units 46 comprises a fiberoptic receiver 52 which outputs to an RF splitter 54 which supplies RF signals along individual satellite signal links 56, each of which supplies at least one satellite receiver 58.

Figure 3:
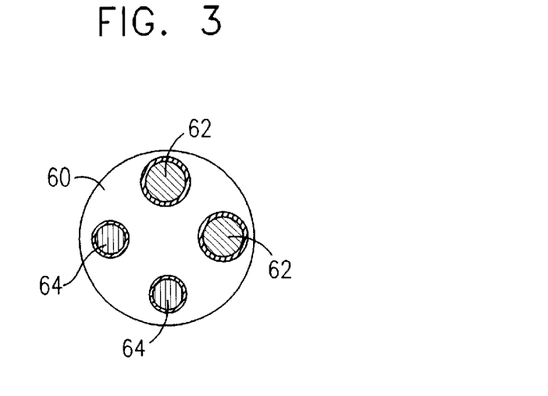
FIG. 3 is a sectional illustration taken along lines III—III in FIG. 1, illustrating the use of a composite cable in accordance with one embodiment of the present invention.

Reference is now made to FIG. 3, which is a sectional illustration taken along lines III—III in FIG. 1, illustrating the use of a composite cable 60 in accordance with one embodiment of the present invention. It is seen that the composite cable 60 includes a plurality of copper wires 62 for providing power to receive and distribution units (16 and 46) and a plurality of optical fibers 64, which are preferably multimode optical fibers. Any combination and quantity of copper wires 62 and optical fibers 64 may be used.

Alternatively, receive and distribution units (16 and 42) may be powered by the power intended for LNB's in usual single-user installations.

Figure 4:
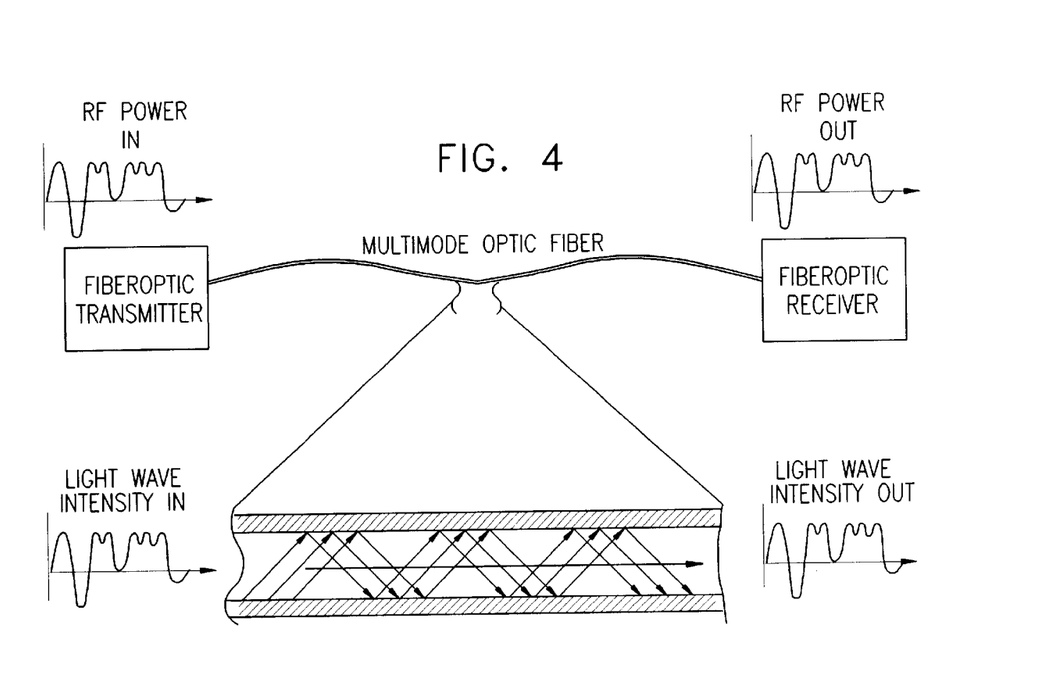
FIG. 4 is a simplified pictorial illustration of a multimode optical fiber link carrying an RF signal in accordance with a preferred embodiment of the present invention.

FIG. 4 illustrates a multimode optical fiber link carrying an RF signal in accordance with a preferred embodiment of the present invention. It is a particular feature of the present invention that such a multimode optical fiber link is employed to transmit analog signals, whether or not digitally modulated, having a frequency in excess of about 1 GHz between the headend (10 or 40) and the receive and distribution units (16 and 46).

Figure 5:
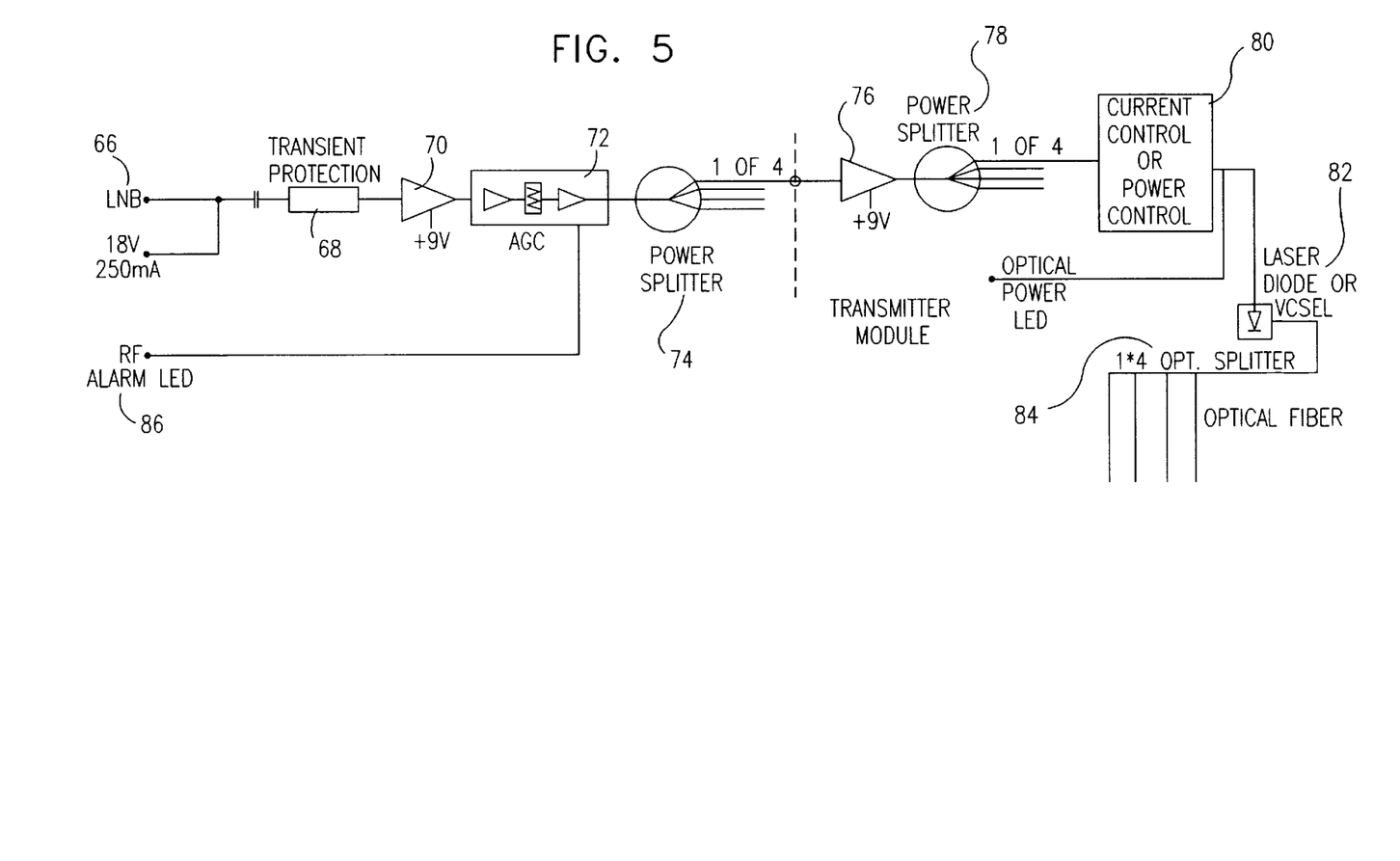
FIG. 5 is a simplified block diagram illustration of an optical transmitter useful in the present invention.

Reference is now made to FIG. 5 which is a simplified block diagram illustration of an optical transmitter useful in the present invention. An RF L-band signal is input via coaxial cable from a low noise block (LNB) converter 66, power being provided along the same coaxial cable. The input is protected against lightning strikes using a transient protection circuit 68. The signal is then amplified using an amplifier 70 which generally includes an automatic gain control (AGC) 72 that typically activates an alarm LED 86 should the signal strength fall below a predetermined level. The output power of the amplifier section is split, typically 4 ways, via a power splitter 74 to a plurality of transmitter modules. Each transmitter module includes an amplifier 76 for providing further amplification as required. The output of amplifier 76 may drive a laser diode 82 or may be split, typically 4 ways, via a power splitter 78, or via taps (not shown), to drive a plurality of laser diodes 82. Current or power control may be provided by a current or power control unit 80 as is well known in the art. Alternatively, the optical power of each laser may be split using a fiber optical splitter 84 such as 1×4 lasers rather than using 4 individual laser diodes in the transmitter module.

Figure 6:
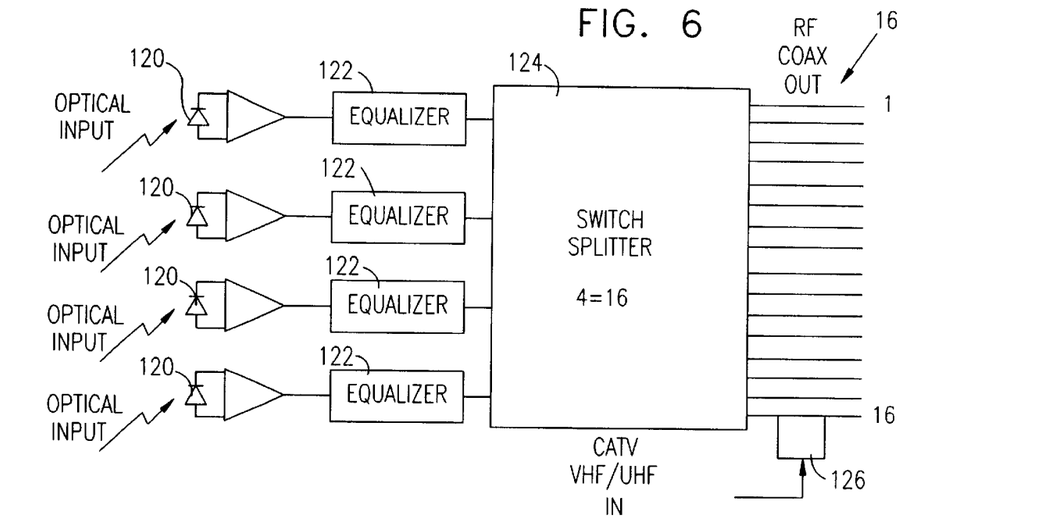
FIG. 6 is a simplified block diagram illustration of a satellite signal receive and distribution unit constructed and operative in accordance with a preferred embodiment of the present invention including apparatus for combining CATV and satellite signal feeds onto a single coaxial cable.

Reference is now made to FIG. 6, which is a simplified block diagram illustration of a satellite signal receive and distribution unit constructed and operative in accordance with a preferred embodiment of the present invention including apparatus for combining CATV and satellite signal feeds onto a single coaxial cable. A plurality of fiber optic receivers 120, each for a separate signal, each output via an equalizer 122 to a switch splitter 124 which selectably provides a signal to each of a multiplicity of individual satellite signal links 26 or 56 (FIG. 1 or FIG. 2). A CATV feed 126 may be coupled to each of the individual satellite signal links, as illustrated conceptually below with reference to FIG. 7.

Figure 7:
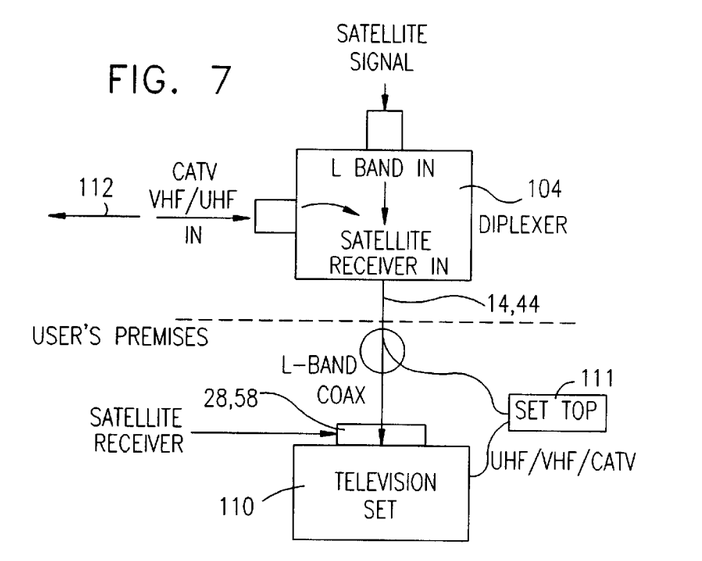
FIG. 7 is a conceptual illustration of combining CATV/UHF/VHF (5–860 MHz) and satellite signals onto a single coaxial cable in accordance with a preferred embodiment of the present invention.

FIG. 7 provides a conceptual illustration of combining CATV/UHF/VHF and satellite signals onto a single coaxial cable, which in accordance with a preferred embodiment of the present invention, is one of the functions of the receive and distribution units (16 and 46). Receive and distribution units (16 and 46) preferably include a diplexer 104 that receives a satellite signal from a satellite antenna, such as antenna 12 or 42, and also receives a non-satellite television signal, such as a CATV input, typically including both UHF and VHF signals. The diplexer 104 outputs via coaxial cable 14 or 44 (FIGS. 1 and 2 respectively). The combined signals may be supplied through the apparatus of FIGS. 1 or 2. An important advantage of the present invention is that by outputting to a single coaxial cable (14 or 44), significant savings in cable laying are achieved.

Just upstream of the satellite receiver, a demultiplexer splits off the CATV signals from the L-band satellite signals for separate supply thereof to the appropriate inputs of the satellite receiver 28 or 58 (FIG. 1 or FIG. 2) and the television set 110. A set top 111 may be provided for reception of CATV signals.

Provision may be made for interactive television, wherein a return signal 112 may be sent by an end user of television set 110 via the non-satellite television signal port of diplexer 104. Return signal 112 is typically low frequency, in the range of 5–50 MHz.

Figure 8:
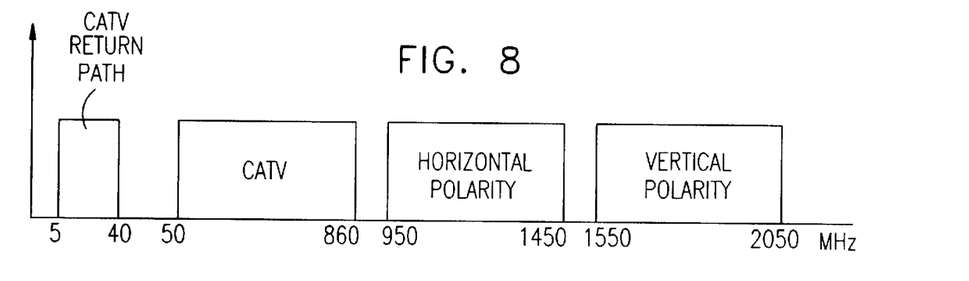
FIG. 8 is a simplified illustration of a frequency spectrum of a satellite signal distribution system using frequency stacking in accordance with a preferred embodiment of the present invention.

Reference is now made to FIG. 8 which illustrates a frequency spectrum of a satellite signal distribution system using frequency stacking in accordance with a preferred embodiment of the present invention. As mentioned hereinabove with reference to FIG. 5, an RF L-band signal may be input via coaxial cable from a low noise block (LNB) converter. An LNB typically outputs two polarities. These polarities may be put on one single coaxial cable by upconverting one of them, preferably from a 950–1450 MHz band to a higher band of 1550–2050 MHz. This technique is known as frequency stacking and has been in commercial use since at least 1993. An advantage of implementing this technique with the satellite signal distribution systems of the present invention is that switching described hereinabove with reference to FIG. 6 is not required and the satellite signal may be split at a user site to multiple television sets. Frequency stacking may be implemented with any of the satellite signal distribution systems of the present invention, such as those shown in FIGS. 1 and 2.

As described hereinabove, in the satellite signal distribution systems of FIGS. 1 and 2, the headend (10 or 40 respectively) receives satellite signals from the satellite antenna (12 or 42) and the RF fiberoptic transmitter transmits a combined signal along optical fibers (14 or 44) to satellite signal receive and distribution units (16 or 46). The satellite signal receive and distribution units (16 or 46) receive optical signals and convert to RF signals, and diplex the UHF/VHF/CATV signal from 50–860 MHz with the L-band signal, allowing a return path using the frequency band 5–40 MHz. By using fiberoptic receivers (22 or 52) and RF splitters (24 or 54), the signal is split into a number of outputs, and the signals are demultiplexed to standard satellite receivers (28 or 58) and television sets (110).

In accordance with yet a further preferred embodiment of the present invention, the UHF/VHF/CATV signal and the satellite signal may be alternatively combined, instead of at the receiver, at the fiberoptic transmitter, preferably located in the headend, as will be now described with reference to FIGS. 9–13.

Figure 9:
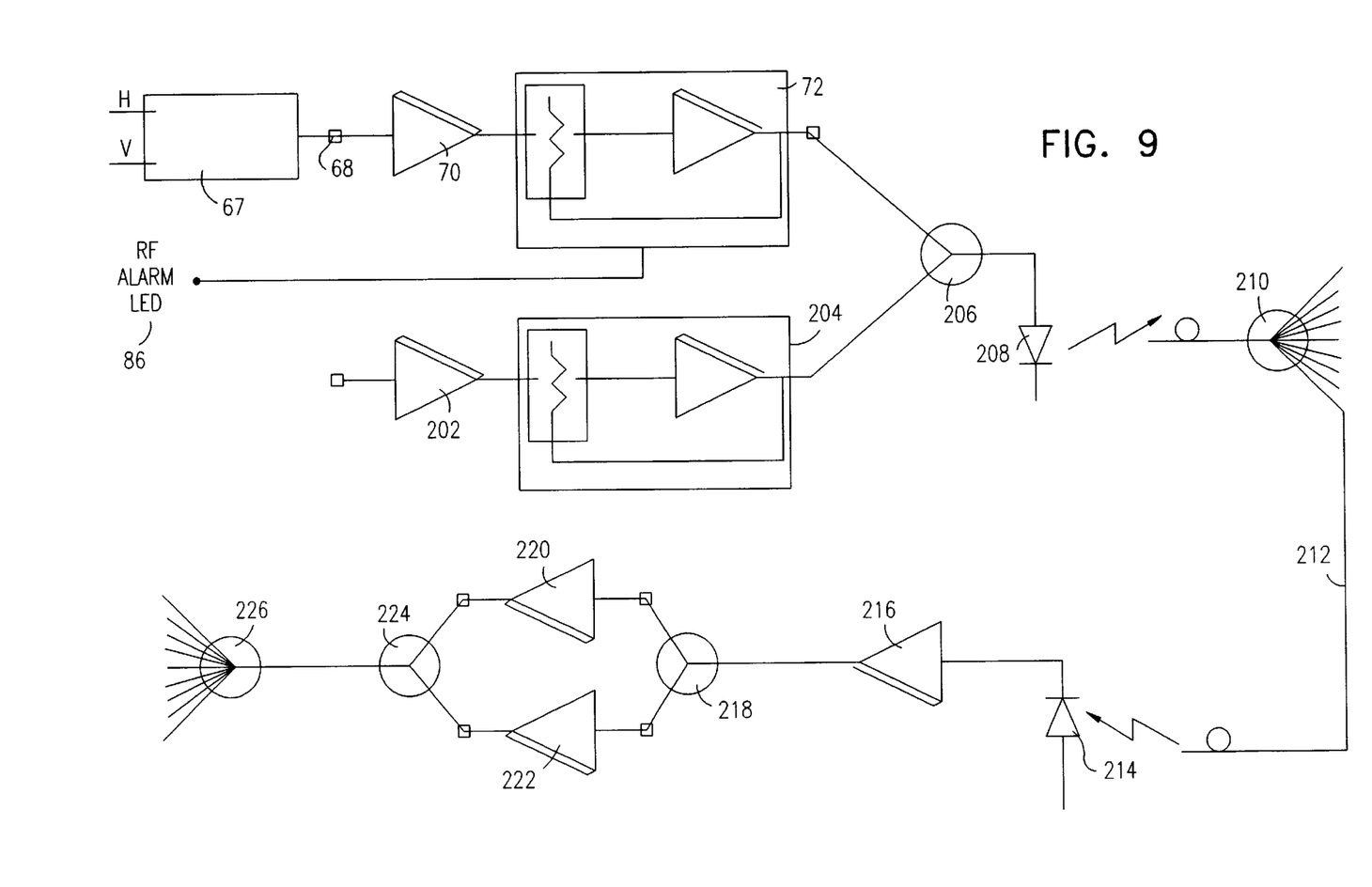
FIG. 9 is a simplified block diagram illustration of an optical transmitter satellite-and-television-signal combiner system constructed and operative in accordance with a preferred embodiment of the present invention.

Reference is now made to FIG. 9 which is a simplified block diagram illustration of an optical transmitter satellite-and-television-signal combiner system constructed and operative in accordance with a preferred embodiment of the present invention. In a similar fashion as described hereinabove with reference to FIG. 5, an RF L-band signal is input via coaxial cable from a frequency stacker or up-converter 67, power being provided along the same coaxial cable. The input may be protected against lightning strikes using transient protection circuit 68. The signal is then amplified using amplifier 70 which generally includes automatic gain control (AGC) 72 that typically activates an alarm LED 86 should the signal strength fall below a predetermined level.

In parallel to the RF L-band signal input, a television (UHF/VHF/CATV) signal is amplified using an amplifier 202 which generally includes an automatic gain control (AGC) 204. The outputs of the AGC's 72 and 204 are combined by a diplexer/combiner 206 to drive a distributed feedback (DFB) laser 208, such as a laser diode. The optical power of laser 208 is preferably split using a fiber optical splitter 210 and fed to a plurality of optical receivers via optical fibers 212. Each optical fiber 212 preferably feeds a photodiode 214 which converts the optical signals back to electrical signals which are preferably outputted to an amplifier 216. A demultiplexer/splitter 218 then demultiplexes the electrical signals to satellite and television amplifiers 220 and 222, respectively. The satellite and television signals are combined by a diplexer 224 and then split by a splitter 226, preferably a resistance splitter, for feeding standard satellite receivers and television sets.

An advantage of the system of FIG. 9 is that only one diplexer 224 is required. However, a disadvantage of this system is that the splitter 226 is quite lossy and it is difficult to obtain good isolation between output ports of the splitter 226.

Figure 10:
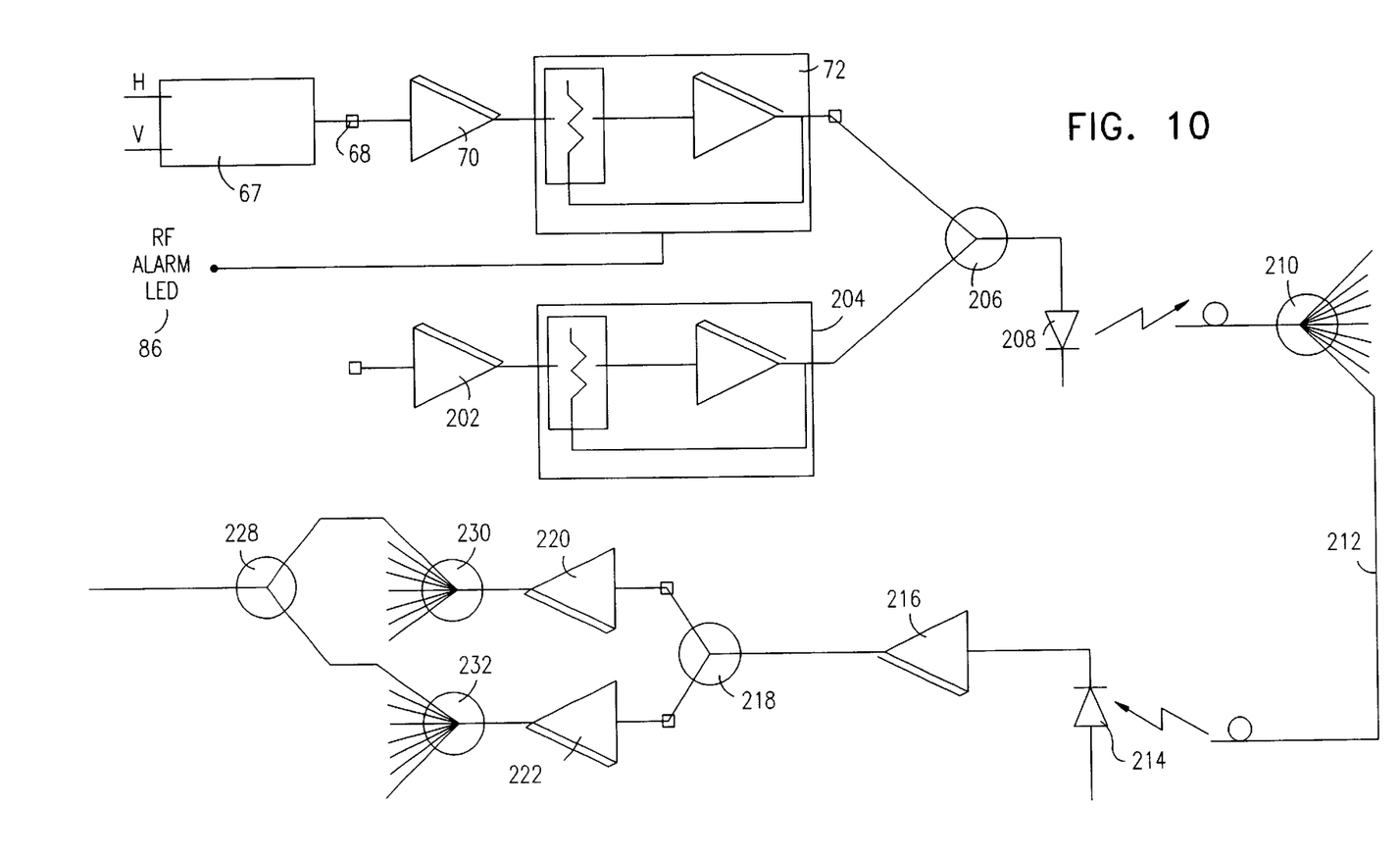
FIG. 10 is a simplified block diagram illustration of an optical transmitter satellite-and-television-signal combiner system constructed and operative in accordance with another preferred embodiment of the present invention.

Reference is now made to FIG. 10 which is a simplified block diagram illustration of an optical transmitter satellite-and-television-signal combiner system constructed and operative in accordance with another preferred embodiment of the present invention. The system of FIG. 10 is substantially identical with that of FIG. 9 with like numerals designating like elements. The system of FIG. 10 differs from that of FIG. 9 in that each of a plurality of N diplexers 228 combine the paired outputs of two N-way splitters 230 and 232, which split satellite and television signals, respectively. Splitters 230 and 232 are preferably narrower in band than splitter 226 of FIG. 9, thus having the advantage of reducing losses and increasing isolation between the output ports. Splitters 230 and 232 may be reactive splitters. A disadvantage of the system of FIG. 10 is that N diplexers 228 are required.

Figure 11:
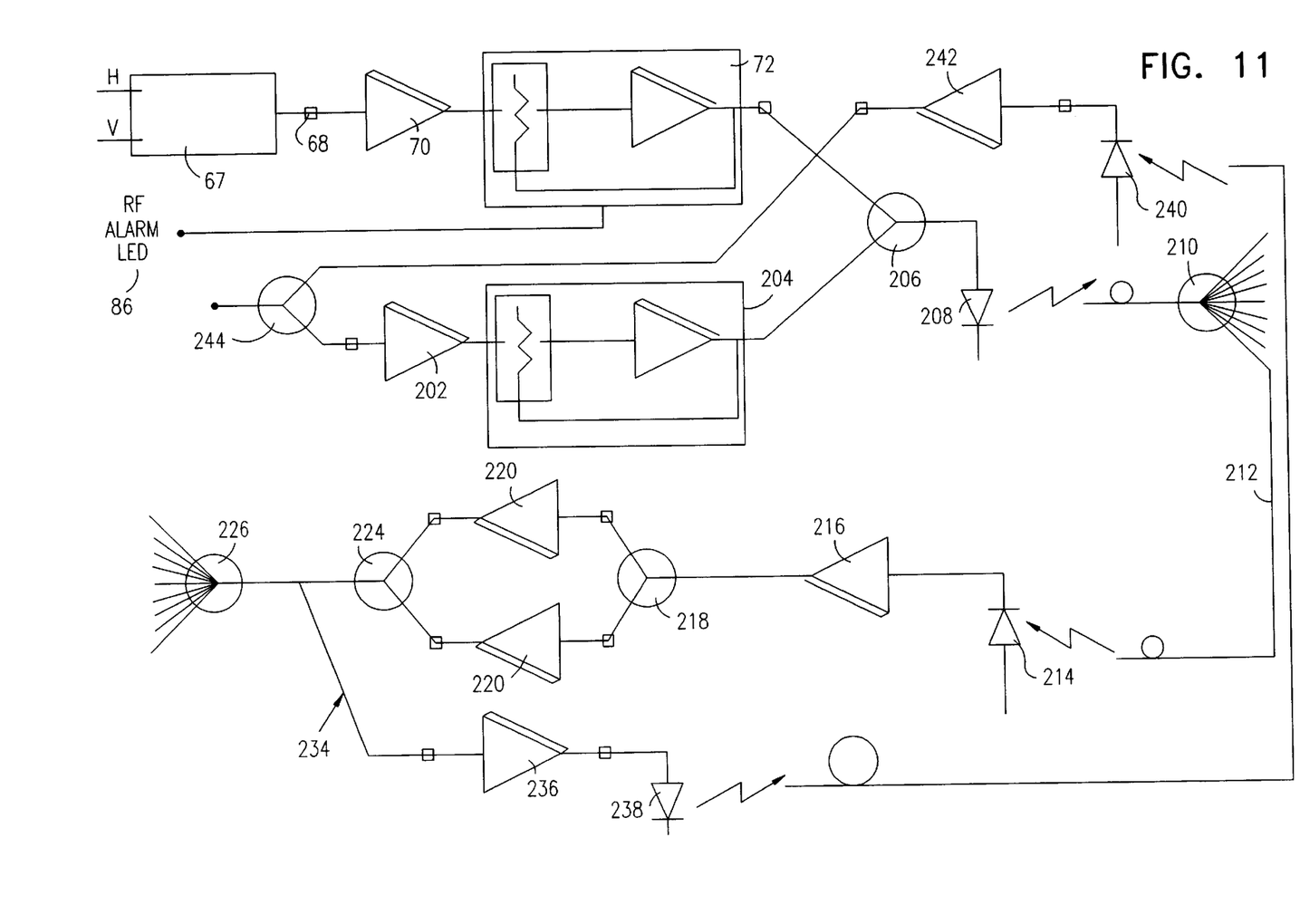
FIG. 11 is a simplified block diagram illustration of an optical transmitter satellite-and-television-signal combiner system constructed and operative in accordance with yet another preferred embodiment of the present invention.

Reference is now made to FIG. 11 which is a simplified block diagram illustration of an optical transmitter satellite-and-television-signal combiner system constructed and operative in accordance with yet another preferred embodiment of the present invention. The system of FIG. 11 is substantially identical with that of FIG. 9 with like numerals designating like elements. The system of FIG. 11 differs from that of FIG. 9 in that provision is made for interactive television, wherein a non-satellite television return path 234 is provided. Return path 234 preferably comprises sending a non-satellite television return signal via an amplifier 236 to drive an optical emitter 238 which outputs to a photodiode 240. Photodiode 240 converts the optical signal to an electrical signal and sends the electrical signal via an amplifier 242 to a non-satellite television signal port of a combiner 244. As described hereinabove, the return signal is typically low frequency, in the range of 5–50 MHz. Photodiode 240 and amplifier 242 may be packaged as an integrated optical module.

Figure 12:
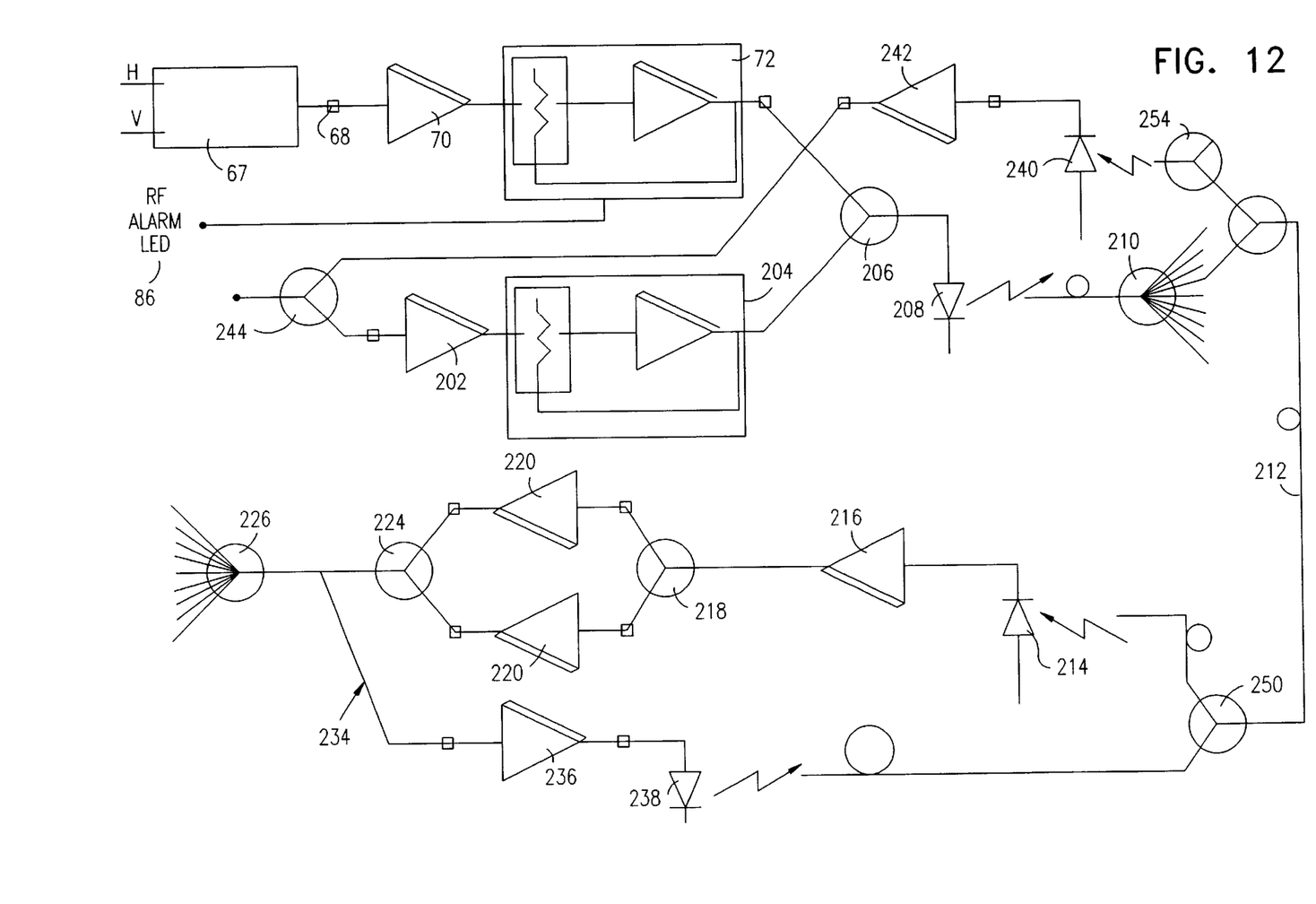
FIG. 12 is a simplified block diagram illustration of an optical transmitter satellite-and-television-signal combiner system constructed and operative in accordance with still another preferred embodiment of the present invention.

Reference is now made to FIG. 12 which is a simplified block diagram illustration of an optical transmitter satellite-and-television-signal combiner system constructed and operative in accordance with still another preferred embodiment of the present invention. The system of FIG. 12 is substantially identical with that of FIG. 11 with like numerals designating like elements. The system of FIG. 12 differs from that of FIG. 11 in that the non-satellite television return path 234 comprises sending the non-satellite television return signal not on separate fibers, but rather the return signal is sent on one fiber by means of a wavelength division multiplexer 250. Alternatively, wavelength division multiplexer 250 may be an optical combiner. Multiplexer 250 sends the optical signals on the same optical fiber 212 to another wavelength division multiplexer 252 which is connected to splitter 210. Multiplexer 252 outputs to photodiode 240 as described with reference to FIG. 11. Optionally, an optical combiner 254 may be connected to multiplexer 252, in which case combiner 254, photodiode 240 and amplifier 242 may be wholly or partially packaged as an integrated optical module.

Figure 13:
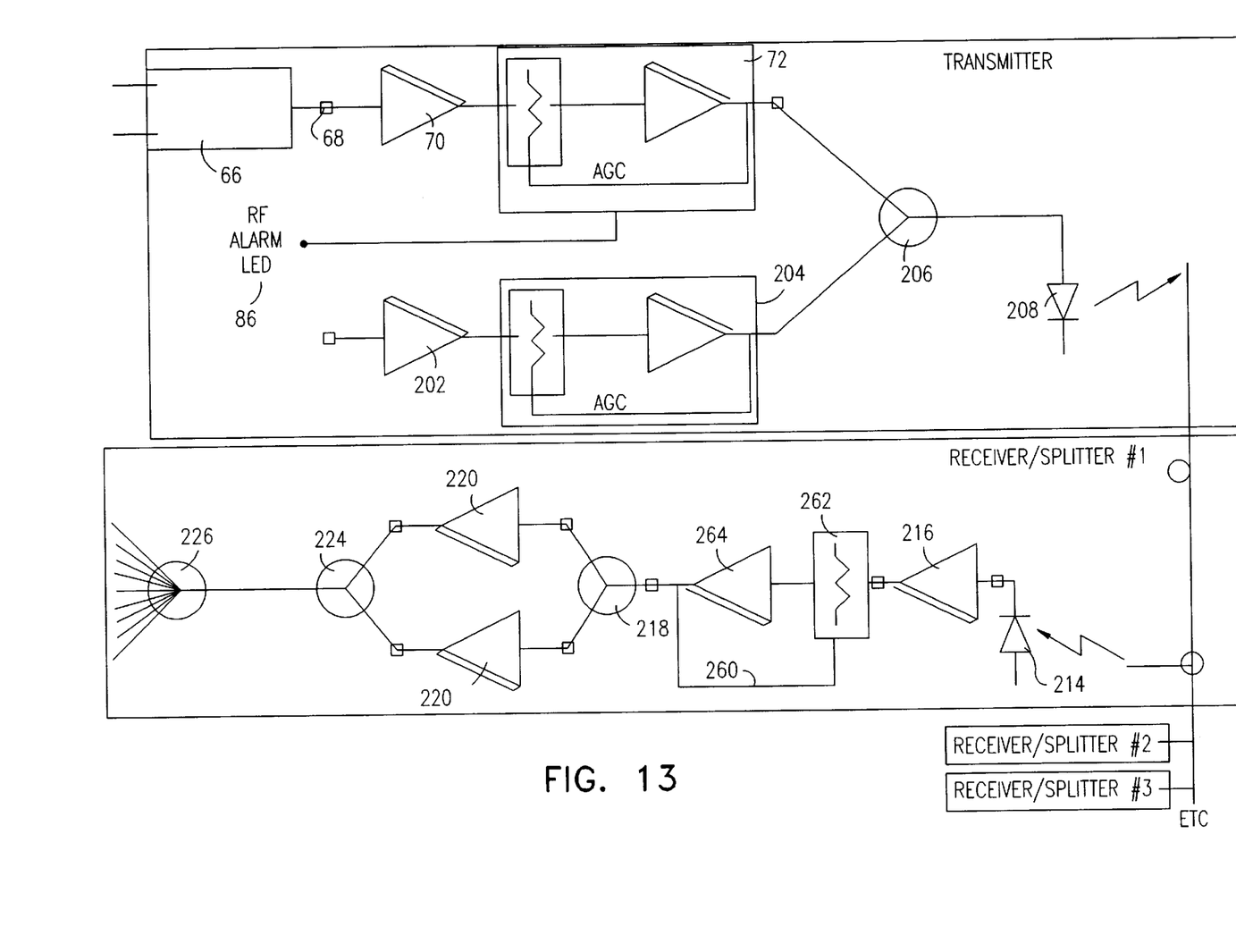
FIG. 13 is a simplified block diagram illustration of an optical transmitter satellite-and-television-signal combiner system constructed and operative in accordance with another preferred embodiment of the present invention.

It is appreciated that the systems of FIGS. 12 and 13 may be implemented in the system of FIG. 10 as well.

Reference is now made to FIG. 13 which is a simplified block diagram illustration of an optical transmitter satellite-and-television-signal combiner system constructed and operative in accordance with another preferred embodiment of the present invention. The system of FIG. 13 is substantially similar to that of FIG. 9 with like numerals designating like elements, except that the system of FIG. 13 has a vertical or series architecture. An automatic gain control 260, operating between an attenuator 262 and an amplifier 264, is preferably placed between amplifier 216 and demultiplexer/splitter 218. The automatic gain control line 260 detects the output of amplifier 264 and sends a signal to attenuator 262 to change the output of amplifier 264 as necessary. The purpose, inter alia, of automatic gain control 260 is to ensure that all customers on all levels receive substantially the same power. This means that automatic gain control 260 minimizes the gain of amplifier 264 at the top level of the "daisy chain" series, and maximizes the gain of amplifier 264 at the lowest level of the "daisy chain" series.

It will be appreciated by persons skilled in the art that the present invention is not limited by what has been particularly shown and described hereinabove. Rather the scope of the present invention is defined only by the claims which follow.

What is claimed is:

1. A satellite signal distribution system comprising:
    a headend which receives satellite signals from a satellite antenna and directly converts them to optical signals without further modulation;
    a plurality of satellite signal receive and distribution units;
    a plurality of optical fiber links which communicate said optical signals between the headend and the plurality of satellite signal receive and distribution units; and
    a multiplicity of satellite signal links which communicate satellite signals between each of said plurality of satellite signal receive and distribution units and plural satellite receivers.

2. A system according to claim 1 wherein said plurality of optical fiber links communicate said satellite signals between the headend and the plurality of satellite signal receive and distribution units serially.

3. A system according to claim 1 and also comprising a satellite antenna which is coupled to the headend.

4. A system according to claim 2 and also comprising a satellite antenna which is coupled to the headend.

5. A system according to claim 1 and also comprising a plurality of satellite receivers which are coupled to at least some of the multiplicity of satellite signal links.

6. A system according to claim 2 and also comprising a plurality of satellite receivers which are coupled to at least some of the multiplicity of satellite signal links.

7. A system according to claim 1 and wherein said headend, said plurality of satellite signal receive and distribution units, said plurality of optical fiber links and said multiplicity of satellite signal links all carry satellite signals in a 1–2.2 GHz frequency range.

8. A system according to claim 1 wherein said satellite receive and distribution units comprise a diplexer which outputs to a single coaxial cable a combination of said satellite signals and non-satellite television signals.

9. A system according to claim 8 wherein said diplexer provides a low frequency return path signal from a user to a source of said non-satellite television signal.

10. A system according to claim 1 wherein said satellite receive and distribution units comprise apparatus for receiving optical signals and converting to RF signals.

11. A system according to claim 1 wherein said satellite receive and distribution units comprise apparatus for equalizing any frequency tilt caused by a coaxial cable connection to a satellite receiver.

12. A system according to claim 1 wherein said satellite receive and distribution units comprise a splitter for splitting a signal into a number of outputs.

13. A system according to claim 1 wherein said satellite receive and distribution units comprise an interface to a satellite receiver.

14. A system according to claim 1 and comprising a coaxial cable connection to a satellite receiver wherein a single coaxial cable carries a signal having more than one polarity, one of the polarities being upconverted to a higher frequency band than another polarity.

15. A satellite signal distribution system comprising:
a fiberoptic transmitter that combines satellite signals from a satellite antenna with non-satellite television signals and directly converts them to optical signals without further modulation;
a plurality of signal receive and distribution units;
a plurality of optical fiber links which communicate said optical signals between said fiberoptic transmitter and said plurality of signal receive and distribution units; and
a multiplicity of signal links which communicate signals between each of said plurality of signal receive and distribution units and a plurality of satellite signal receivers and non-satellite signal receivers.

16. A system according to claim 15 and wherein said fiberoptic transmitter comprises a laser that converts said combined satellite signals and said non-satellite television signals into optical signals.

17. A system according to claim 16 and comprising a photodiode that converts said optical signals into electrical signals.

18. A system according to claim 17 wherein each of said plurality of signal receive and distribution units comprises said photodiode.

19. A system according to claim 17 and comprising a splitter for feeding said electrical satellite signals and said non-satellite television signals to a satellite receiver and to at least one of a television set and a CATV receiver, respectively.

20. A system according to claim 17 and comprising a plurality of a pair of splitters in communication with said photodiode, each said pair comprising a splitter for satellite signals and a splitter for non-satellite television signals, wherein a plurality of diplexers combines an output of each said pair of said splitters for feeding said satellite signals and said non-satellite television signals to a satellite receiver and to at least one of a television set and a CATV receiver, respectively.

21. A system according to claim 17 and comprising a non-satellite television return path for sending a return signal from a user to a source of a non-satellite television signal.

22. A system according to claim 21 wherein said return signal is sent on separate fibers.

23. A system according to claim 21 wherein said return signal is sent on a fiber by means of a wavelength division multiplexer.

* * * * *

UNITED STATES PATENT AND TRADEMARK OFFICE
CERTIFICATE OF CORRECTION

PATENT NO.   : 6,486,907 B1
DATED        : November 26, 2002
INVENTOR(S)  : Allan Farber et al.

It is certified that error appears in the above-identified patent and that said Letters Patent is hereby corrected as shown below:

<u>Title page,</u>
Item [75], Inventors, "Mor Alon" should be -- Mor Allon --

Signed and Sealed this

Fifteenth Day of April, 2003

JAMES E. ROGAN
*Director of the United States Patent and Trademark Office*